United States Patent
Hinds et al.

(10) Patent No.: US 6,542,916 B1
(45) Date of Patent: Apr. 1, 2003

(54) DATA PROCESSING APPARATUS AND METHOD FOR APPLYING FLOATING-POINT OPERATIONS TO FIRST, SECOND AND THIRD OPERANDS

(75) Inventors: Christopher Neal Hinds, Austin, TX (US); David Vivian Jaggar, Austin, TX (US); David James Seal, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/362,182

(22) Filed: Jul. 28, 1999

(51) Int. Cl.[7] .............................................. G06F 7/38
(52) U.S. Cl. ................................... 708/501; 708/523
(58) Field of Search ............................... 708/501, 523

(56) References Cited

U.S. PATENT DOCUMENTS

| | | | |
|---|---|---|---|
| 4,969,118 A | 11/1990 | Montoye et al. | 364/748 |
| 5,796,645 A | 8/1998 | Peh et al. | 364/750.5 |
| 5,880,984 A | 3/1999 | Burchfiel et al. | 708/501 |
| 6,115,729 A * | 9/2000 | Matheny et al. | 708/501 |
| 6,275,838 B1 * | 8/2001 | Blomgren et al. | 708/501 |
| 6,298,366 B1 * | 10/2001 | Gatherer et al. | 708/501 |

OTHER PUBLICATIONS

C. Price, MIPS IV Instruction Set, Revision 3.2, Sep. 1995, pp. B–78 to B79.
I. Kuroda et al, "A 16–Bit Parallel MAC Architecture for a Multimedia RISC Processor" pp. 103–112.

* cited by examiner

Primary Examiner—David H. Malzahn
(74) Attorney, Agent, or Firm—Nixon & Vanderhye P.C.

(57) ABSTRACT

A data processing apparatus and method is provided for applying a floating-point multiply-accumulate operation to first, second and third operands. The apparatus comprises a multiplier for multiplying the second and third operands and applying rounding to produce a rounded multiplication result, and an adder for adding the rounded multiplication result to the first operand to generate a final result and for applying rounding to generate a rounded final result. Further, control logic is provided which is responsive to a first single instruction to control the multiplier and adder to cause the rounded final result generated by the adder to be equivalent to the subtraction of the rounded multiplication result from the first operand. In preferred embodiments, the control logic is also responsive to a further single instruction to control the multiplier and adder to cause the rounded final result generated by the adder to be equivalent to the subtraction of the rounded multiplication result from the negated first operand.

By this approach, multiply-accumulate logic can be arranged to provide fast execution of a first single instruction to generate a result equivalent to the subtraction of the rounded multiplication result from the first operand, or a second single instruction to generate a result equivalent to the subtraction of the rounded multiplication result from the negated first operand, whilst producing results which are compliant with the IEEE 754-1985 standard.

18 Claims, 5 Drawing Sheets

DATA PROCESSING APPARATUS AND METHOD FOR APPLYING FLOATING-POINT OPERATIONS TO FIRST, SECOND AND THIRD OPERANDS

BACKGROUND OF THE INVENTION

1. Field of the Invention

The present invention relates to a data processing apparatus and method for applying floating-point operations to first, second and third operands.

2. Description of the Prior Art

It is common for data processing apparatus to be required to perform various floating-point computations on data. It has been found that general purpose processors are not well suited to the performance of floating-point computations, and hence this has led to the development of specialised floating-point units (FPUs) to handle such computations.

One particular floating-point computation which is commonly required is a multiply-accumulate operation A+(B*C), whereby two numbers are multiplied together, and the product is then added to a third number. Although a multiply-accumulate operation can be performed by executing a multiplication instruction followed by a separate accumulate instruction, such an approach is relatively slow. Hence, there has been a great deal of interest in developing FPUs arranged specifically to perform multiply-accumulate operations with increased speed.

Examples of FPUs designed specifically to increase the speed of a multiply-accumulate operation and/or reduce circuit complexity can be found in U.S. Pat. No. 4,969,118, U.S. Pat. No. 5,241,493, U.S. Pat. No. 5,375,078, U.S. Pat. No. 5,530,663, EP-A-0,645,699, U.S. Pat. No. 4,866,652 and U.S. Pat. No. 4,841,467. Alternatively, the multiplier and adder can be retained as separate logic units.

Another similar floating-point computation often used is a multiply-subtract operation −A+(B*C), which typically can be performed using the same multiply-accumulate logic, but negating the value A before it is input to the adder.

In addition to performing the above multiply-accumulate and multiply-subtract operations, it is desirable to also be able to produce negated versions of the multiply-accumulate and multiply-subtract operations, since such operations are useful in complex multiply routines, Fast Fourier Transform (FFT) and filter routines, and general computations used by a compiler.

Intel describe an instruction for performing a negated version of the multiply-subtract operation in the IA-64 Application Developer's Architecture Guide, Rev 1.0, page 7–59. Here a "floating-point negative multiply add" instruction is defined, where the product of two floating-point register values is computed to infinite precision, negated, and then the value in a third floating-point register is added to the product, again in infinite precision. Rounding is then performed on the final value. Hence, this Intel instruction evaluates the expression A−(B*C).

A standard was produced in 1985 to ensure a consistent approach in the way in which floating-point computations are handled by various data processing apparatus, this standard being called the "IEEE Standard for Binary Floating-Point Arithmetic", ANSI/IEEE Std 754-1985, The Institute of Electrical and Electronic Engineers, Inc., New York, 10017 (hereafter referred to as the IEEE 754-1985 standard). This standard defined, amongst other things, that a multiplication operation should finish with a rounding operation, and similarly that an add, or accumulate, operation should finish with a rounding operation. The IEEE 754-1985 standard further provided a definition of a number of rounding operations which would be considered to be compliant with the IEEE 754-1985 standard.

In accordance with the above Intel technique, a 'fused' multiply-accumulate circuit is used, which results in efficient processing of the above instruction, but means that the result of the multiplication is not independently determined prior to the accumulate operation. Further, the multiplication is performed to an internal precision which contains all of the bits from the multiplication (for an n×n bit multiplication the result is 2n bits) and the accumulation is then performed using all of the multiply bits. Due to this approach, no rounding is performed on the result of the multiplication before that result is used in the subsequent accumulation. Hence, it is apparent that this technique is not compliant with the IEEE 754-1985 standard since that standard defines that a rounding operation should be performed on the result of the multiplication.

Another way of performing negated versions of the multiply-accumulate and multiply-subtract operations would be to perform the multiply-accumulate and multiply-subtract operations as usual and then negate the final result output by the FPU. In this way the negated operations −(A+(B*C)) and −(−A+(B*C) can be performed, and these operations will produce the desired algebraic results.

Indeed, the IBM Power architecture specifies multiply-add with negate functions of the above type. According to the PowerPC 601 RISC Microprocessor User's Manual, (IBM) 52G7484 (MPR601UMU-02) or (MOT) MPC601UM/AD, REV 1, pp. 10–76-10–79, the IBM Power architecture specifies the following four instructions:

fnmaddx: frD=−([(frA)*(frC)]+(frB))

fnmaddsx: (same, but with single precision data)

fnmsubx: frD=−([(frA)*(frC)]−(frB))

fnmsubsx: (same, but with single precision data)

Like Intel's approach, IBM used a fused multiply-accumulate unit, and so also cannot guarantee results which are compliant with the IEEE 754-1985 standard.

The MIPS IV architecture also defines two instructions which perform multiply-add negate functions similar to the IBM instructions, the instructions being as follows:

NMADD.fmt: fd=−((fs*ft)+fr)

NMSUB.fmt: fd=−((fs*ft)−fr)

The description on pages B-78 to B-79 of the "MIPS IV Instruction Set", Revision 3.2, September 1995, by Charles Price, reads as follows: "The value in fs is multiplied by the value in FPR ft to produce an intermediate product. The value in FPR fr is added to/subtracted from the product. The result sum is calculated to infinite precision, rounded according to the current rounding mode in FCSR, negated by changing the sign bit, and placed in FPR fd."

Since the MIPS architecture retains the multiplier and adder as separate logic units, then when performing a multiply-accumulate operation, rounding is applied to the output of the multiplier unit, and this output is then input to the adder logic unit, with the result of the adder logic unit also being rounded. Hence, this enables an IEEE 754-1985 compliant result to be achieved for the expressions −(−A+(B*C)) and −(A+(B*C)).

Further, it will be appreciated that the formula −(−A+(B*C)) is mathematically equivalent to the formula A−(B*C), and similarly the formula −(A+(B*C)) is mathematically equivalent to the formula −A−(B*C), and so instructions of the type as used by MIPS can be used to produce the correct mathematical results for the expressions A−(B*C) or −A−(B*C).

SUMMARY OF THE INVENTION

Viewed from a first aspect, the present invention provides a data processing apparatus for applying a floating-point multiply-accumulate operation to first, second and third operands, comprising: a multiplier for multiplying the second and third operands and applying rounding to produce a rounded multiplication result; an adder for adding the rounded multiplication result to the first operand to generate a final result and for applying rounding to generate a rounded final result; and control logic, responsive to a first single instruction, to control the multiplier and adder to cause the rounded final result generated by the adder to be equivalent to the subtraction of the rounded multiplication result from the first operand.

The present invention realises that although the above-mentioned prior art instructions for performing the computation −(−A+(B*C)) enable the correct mathematical results to be obtained for the formula A−(B*C), those prior art instructions will not produce the correctly signed results for that formula in certain specific situations, in particular where the result is a zero value. This will be explained in more detail below.

The IEEE 754-1985 standard provides, amongst other things, a definition of a number of rounding modes which would be considered to be compliant with the IEEE 754-1985 standard, and defines how a zero result of a sum operation performed on oppositely-signed numbers, or a difference operation performed on like-signed numbers, should be represented in those particular rounding modes.

Such a zero result may occur because the numbers being added or subtracted are of equal magnitude or because the numbers are zero. Irrespective of this, the IEEE 754-1985 standard defines that in the rounding modes "round to nearest" (RN), "round to zero" or "chop" (RZ) and "round to plus infinity" (RP), a zero result of a sum operation performed on oppositely-signed numbers, or a difference operation performed on like-signed numbers, should be represented as a positive zero, whilst in the rounding mode "round to minus infinity" (RM), such a zero should be represented as a negative zero.

Given the above, it will be appreciated that the following signed zero results occur when A and B*C are equal in magnitude and sign:

| | A and B*C equal in magnitude and sign | | | |
|---|---|---|---|---|
| Formula | RN | RZ | RP | RM |
| −(−A + (B*C)) | −0 | −0 | −0 | +0 |
| A − (B*C) | +0 | +0 | +0 | −0 |

Thus, whilst mathematically the earlier mentioned MIPS IV instructions were sufficient to evaluate the correct mathematical result for the formula A−(B*C), since +0 and −0 represent the same number, the present invention has realised that the results obtained using those instructions will not produce the correctly signed results for that formula in the above described instances.

Further, it has been realised that certain real-world systems care about the difference, for example ones using the Java language. Since the IEEE 754-1985 standard specifies different bit pattern representations for +0 and −0, and somewhat different behaviour with regard to the results of subsequent arithmetic operations on them, this has an effect on some systems, such as those using the Java language, which has strict "bit-exact" results requirements. Accordingly, for such systems it is not acceptable to use instructions which evaluate −(−A+(B*C)) to produce results for expressions of the form A−(B*C).

Another area where the difference is important is when re-using old code. When porting old code that evaluated expressions such as A−(B*C) by executing a separate multiply instruction followed by rounding, and then executing a separate subtract instruction followed by rounding, it is clearly important that any new single instruction for evaluating A−(B*C) produces the same result.

In accordance with the present invention, the above problems are addressed by the multiply-accumulate logic being arranged to provide fast execution of a first single instruction to generate a rounded result equivalent to the subtraction of the rounded multiplication result from the first operand, thus producing a result which is compliant with that required by the IEEE 754-1985 standard when evaluating expressions of the form A−(B*C).

Further, since expressions of the form A−(B*C) are more common in practice than expressions of the form −(−A+(B*C)), except in some specialised application areas, it has been found that the first single instruction of the present invention, which provides the IEEE 754-1985 standard compliant zero result when evaluating expressions of the form A−(B*C), is more useful than the earlier mentioned prior art instructions in some application areas.

In preferred embodiments, this first instruction is referred to as an FNMAC instruction, and can be considered as a negate-multiply accumulate instruction.

It will be appreciated that the control logic will provide general control of the multiplier and adder to ensure appropriate operation for a particular instruction, and hence would typically control the inputs to the multiplier and adder and the timing of the operations performed by the multiplier and adder. In preferred embodiments, the control logic includes primitive determination logic responsive to the first single instruction and the sign values of the first, second and third operands to determine whether to cause the adder to perform a like-signed addition (LSA) operation or an unlike-signed addition (USA) operation, and to generate a control signal dependent on the determination.

More particularly, in preferred embodiments, the primitive determination logic is arranged, in response to the first single instruction, to determine from the sign values of the second and third operands the sign value of the rounded multiplication result and to determine that a USA operation should be performed by the adder if the sign of the first operand and the sign of the rounded multiplication result are the same, and that an LSA operation should be performed by the adder if the sign of the first operand and the sign of the rounded multiplication result are not the same.

Preferably, the adder circuitry includes a multiplexer for selecting either the first operand or the negated first operand to be added to the rounded multiplication result, and the control signal is supplied to the multiplexer to cause the negated first operand to be selected for USA operations, and the first operand to be selected for LSA operations.

In preferred embodiments, the apparatus further comprises sign calculation logic incorporating the primitive determination logic and further arranged to generate an initial sign value for the final result. The sign calculation logic is preferably arranged to be responsive to the first single instruction to select the sign of the first operand as the initial sign value.

In accordance with preferred embodiments, if a sum value generated by the adder is negative, it is inverted prior to generation of the final result, and the apparatus further comprises sign adjust logic arranged to invert the initial sign value if a USA operation was performed and the sum value is positive, but to leave the initial sign unadjusted if the sum value is negative.

Further, if the final result is zero, the sign adjust logic is arranged in accordance with preferred embodiments of the present invention to override the initial sign value with a sign value indicated by a predetermined rounding mode. This ensures compliance with the IEEE 754-1985 standard, in particular with regard to how that standard defines how a zero result of a sum or difference operation should be represented in particular rounding modes.

Preferably, the apparatus further comprises rounding logic for performing a rounding operation on the final result as specified by the predetermined rounding mode in order to generate the rounded result.

In preferred embodiments, the control logic is responsive to a second single instruction to control the multiplier and adder to cause the rounded final result generated by the adder to be equivalent to the subtraction of the rounded multiplication result from the negated first operand.

Again, the present invention realises that although the above-mentioned prior art instructions for performing the computation −(A+(B*C)) enable the correct mathematical results to be obtained for the formula −A−(B*C), those prior art instructions will not produce the correctly signed results for that formula in certain specific situations, in particular where the result is a zero value. However, in accordance with preferred embodiments of the present invention, the multiply-accumulate logic can be arranged to provide fast execution of a second single instruction to generate a rounded result equivalent to the subtraction of the rounded multiplication result from the negated first operand, and thus produce a result which is compliant with that required by the IEEE 754-1985 standard when evaluating expressions of the form—A−(B*C).

In preferred embodiments, this second instruction is referred to as an FNMSC instruction, and can be considered as a negate-multiply subtract instruction.

Viewed from a second aspect, the present invention provides a data processing apparatus for applying a floating-point multiply-subtract operation to first, second and third operands, comprising: a multiplier for multiplying the second and third operands and applying rounding to produce a rounded multiplication result; an adder for adding the rounded multiplication result to the negated first operand to generate a final result and for applying rounding to generate a rounded final result; and control logic, responsive to a first single instruction, to control the multiplier and adder to cause the rounded final result generated by the adder to be equivalent to the subtraction of the rounded multiplication result from the negated first operand.

In accordance with the second aspect of the present invention, multiply-accumulate logic can be arranged to provide fast execution of a first single instruction to generate a rounded result equivalent to the subtraction of the rounded multiplication result from the negated first operand, and thus produce a result which is compliant with that required by the IEEE 754-1985 standard when evaluating expressions of the form −A−(B*C).

In accordance with this second aspect, the first instruction is in preferred embodiments referred to as an FNMSC instruction, and can be considered as a negate-multiply subtract instruction.

Responsive to this first single instruction, the primitive determination logic of preferred embodiments is arranged to determine that an LSA operation should be performed by the adder if the sign of the first operand and the sign of the rounded multiplication result are the same, and that a USA operation should be performed by the adder if the sign of the first operand and the sign of the rounded multiplication result are not the same.

Further, in accordance with this aspect of the present invention, the sign calculation logic of preferred embodiments is arranged to be responsive to the first single instruction to select the initial sign value to be equal to the negated sign of the first operand.

Viewed from a third aspect, the present invention provides a method of applying within a data processing apparatus a floating-point multiply-accumulate operation to first, second and third operands, comprising the steps of: arranging a multiplier to multiply the second and third operands and apply rounding to produce a rounded multiplication result; arranging an adder to add the rounded multiplication result to the first operand to generate a final result and to apply rounding to generate a rounded final result; and responsive to a first single instruction, controlling the multiplier and adder to cause the rounded final result generated by the adder to be equivalent to the subtraction of the rounded multiplication result from the first operand.

Viewed from a fourth aspect, the present invention provides a method of applying within a data processing apparatus a floating-point multiply-subtract operation to first, second and third operands, comprising the steps of: arranging a multiplier to multiply the second and third operands and apply rounding to produce a rounded multiplication result; arranging an adder to add the rounded multiplication result to the negated first operand to generate a final result and to apply rounding to generate a rounded final result; and responsive to a first single instruction, controlling the multiplier and adder to cause the rounded final result generated by the adder to be equivalent to the subtraction of the rounded multiplication result from the negated first operand.

BRIEF DESCRIPTION OF THE DRAWINGS

The present invention will be described, further by way of example only, with reference to a preferred embodiment thereof as illustrated in the accompanying drawings, in which.

DESCRIPTION OF A PREFERRED EMBODIMENT

Figure 1:
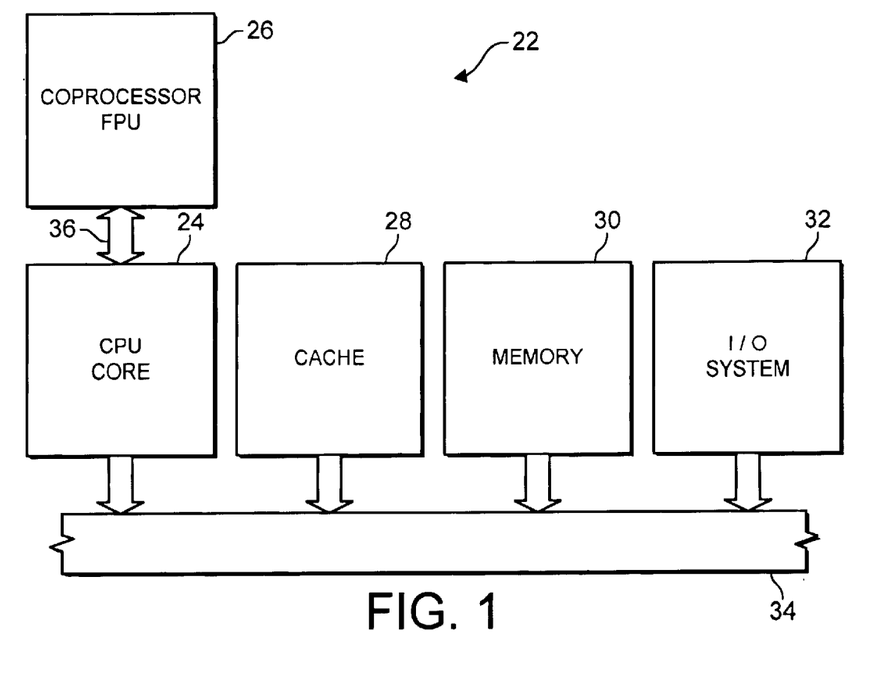
FIG. 1 is a block diagram illustrating elements of a data processing apparatus in accordance with preferred embodiments of the present invention.

FIG. 1 illustrates a data processing system 22 comprising a main processor 24, a floating-point unit (FPU) coprocessor 26, a cache memory 28, a main memory 30 and an input/output system 32. The main processor 24, the cache memory 28, the main memory 30 and the input/output system 32 are linked via a main bus 34. A coprocessor bus 36 links the main processor 24 to the floating-point unit coprocessor 26.

In operation, the main processor 24 (also referred to as the ARM core) executes a stream of data processing instructions that control data processing operations of a general type including interactions with the cache memory 28, the main memory 30 and the input/output system 32. Embedded within the stream of data processing instructions are coprocessor instructions. The main processor 24 recognizes these coprocessor instructions as being of a type that should be executed by an attached coprocessor. Accordingly, the main processor 24 issues these coprocessor instructions on the coprocessor bus 36 from where they are received by any attached coprocessors. In this case, the FPU coprocessor 26 will accept and execute any received coprocessor instructions that it detects are intended for it. This detection is via a coprocessor number field within the coprocessor instruction.

Figure 2:
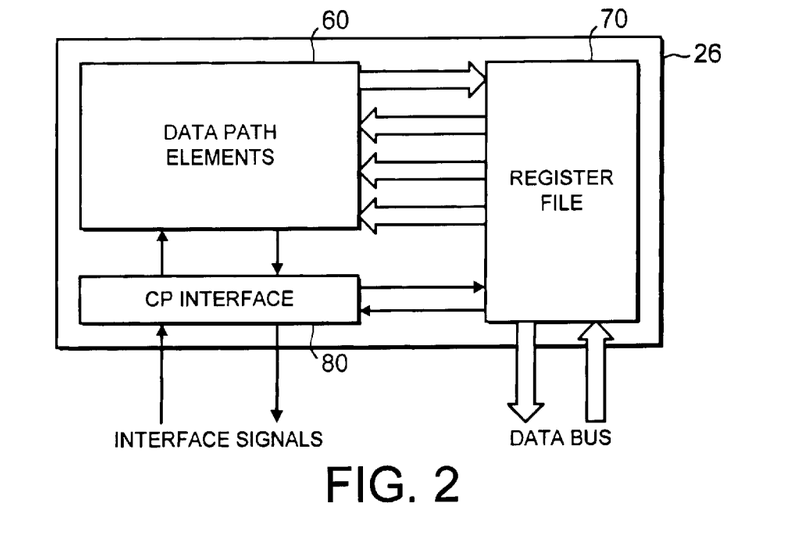
FIG. 2 is a block diagram illustrating elements of the FPU coprocessor in accordance with preferred embodiments of the present invention.

FIG. 2 is a block diagram illustrating in more detail the FPU coprocessor 26 of FIG. 1. As illustrated in FIG. 2, the FPU 26 has a data path elements block 60 for performing the floating-point operation, a coprocessor interface 80 for interfacing with the main processor 24 via the coprocessor bus 36, and a register file 70 for storing, amongst other things, the input values for the floating-point operation and the result of the floating-point operation.

When a floating-point instruction is passed by the main processor to the FPU 26, it is received by the coprocessor interface 80, which determines whether the floating-point instruction can be processed by the FPU 26. Hence, if for any reason, the data path elements block 60 is unable to begin executing a new instruction at the time that new instruction is received, the coprocessor interface 80 will notify the main processor accordingly. However, assuming the instruction can be executed, the coprocessor interface 80 generates control signals for passing to the data path elements block 60 to initiate the floating-point operation.

Prior to execution of the floating-point operation, the input values for the operation are passed over the data bus to the register file 70. The coprocessor interface 80 then sends control signals to the register file 70 to cause the input values to be stored in the appropriate source registers.

When the floating-point operation is initiated, the contents of the source registers are output from the register file 70 to data path elements block 60. Further, on completion of the floating-point operation, the result is passed from the data path elements block to the register file 70 for storing in the appropriate destination register.

An FPU such as FPU 26 may be arranged to perform a floating multiply-accumulate operation (A+(B*C)) or a floating-point multiply-subtract operation (−A+(B*C)) in response to suitable floating-point instructions. The FPU 26 may either be a "fused" multiply-accumulate FPU as illustrated in FIG. 3A, or a "chained" multiply-accumulate FPU as illustrated in FIG. 3B.

Figure 3A:
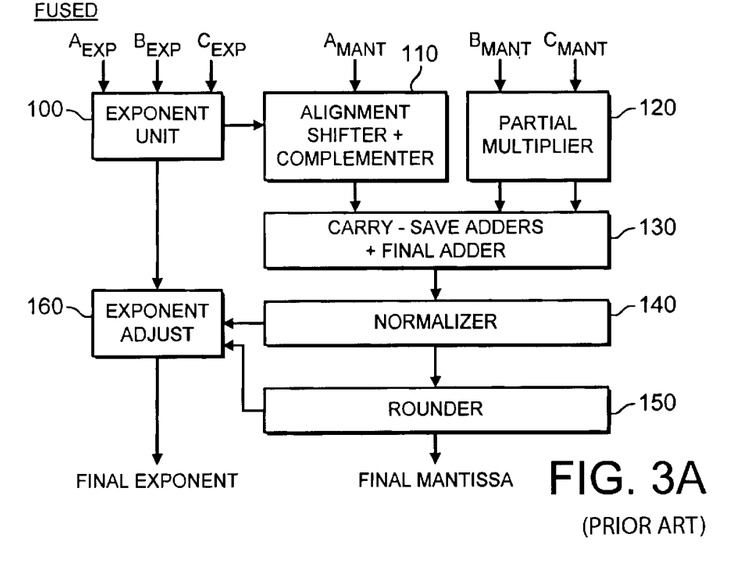
FIG. 3A is a block diagram schematically illustrating a typical "fused" multiply-accumulate FPU.

With reference to FIG. 3A, the exponent and mantissa paths are illustrated for a fused multiply-accumulate FPU arranged to perform functions of the type A+(B*C), or −A+(B*C). The exponents of A, B and C are fed into an exponent unit 100 where the initial exponent value for the result is determined, along with an alignment signal which is based on the difference between the A exponent and the product exponent (for B*C). Further the mantissas of B and C are passed to the partial multiplier 120, which produces the product result in carry/save format. Also, the mantissa of A is passed through the alignment shifter and complementer 110, where it is inverted if −A+(B*C) is to be calculated, and then shifted based on the alignment signal.

The carry-save adders and final adder block 130 then process the output of the alignment shifter and complementer circuit 110 and the partial multiplier 120 to produce a result without independently determining the result of the multiplication B*C. Then, the result is normalized in normalizer 140, with any necessary adjustment also being made to the exponent value by the exponent adjust block 160. Finally rounding is applied by rounder block 150, with any further exponent adjustment required as a result of the rounding also being applied by the exponent adjust block 160.

Figure 3B:
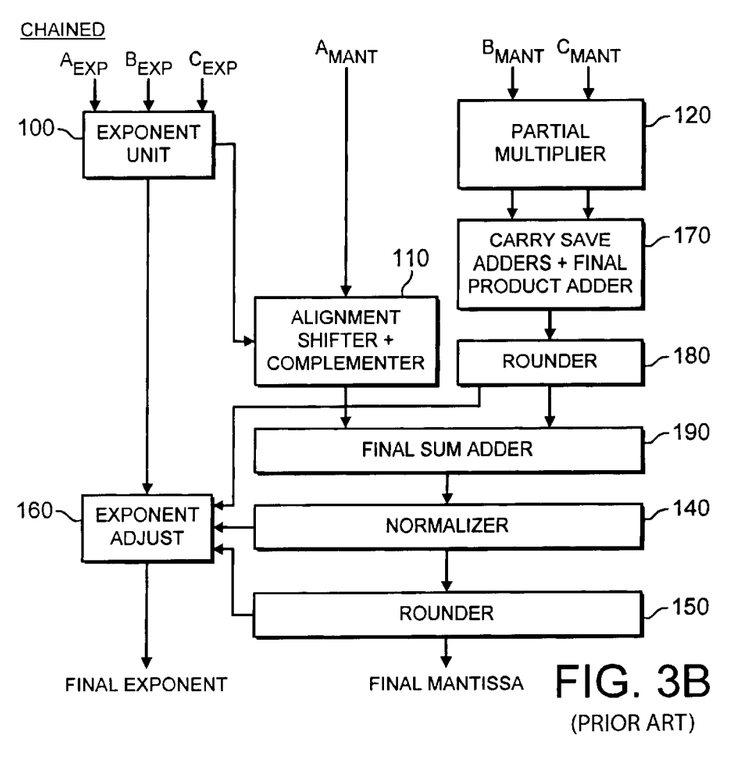
FIG. 3B is a block diagram schematically illustrating a typical "chained" multiply-accumulate FPU.

In contrast, a chained multiply-accumulate FPU operates as illustrated in FIG. 3B. Elements 100, 110 and 120 operate in the same way as described with reference to FIG. 3A. However, the output from the partial multiplier 120 is passed to a carry save adders and final product adder 170 where the product result is determined, this result then being rounded by rounder 180. Any adjustment to the exponent required as a result of this rounding is notified to the exponent adjust block 160.

A final sum adder 190 then performs the addition based on the outputs of the alignment shifter and complementer block 110 and the rounder 180. Then the result is processed by the normalizer 140 and rounder 150 as discussed earlier with reference to FIG. 3A.

As mentioned earlier, one prior art approach for producing negated versions of the multiply-accumulate and multiply-subtract operations performs the multiply-accumulate operation (A+(B*C)) or the multiply-subtract operation (−A+(B*C)), and then the result is output to sign invert logic which, assuming a negated version of the multiply-accumulate or multiply-subtract operation is required, will invert the sign of the result. Hence, irrespective of whether a fused or a chained FPU is used, in such cases the final result will be equivalent to the equation −(A+(B*C)) or −(−A+(B*C)). As discussed earlier, whilst such negated versions of the multiply-accumulate and multiply-subtract operations produce the correct algebraic results, it has been found that they do not produce the correctly signed zero values as required by the IEEE 754-1985 standard in the situations where B*C is equal to A and expressions of the form −A−(B*C) and A−(B*C) are being evaluated.

The other type of prior art mentioned earlier uses a fused multiply-accumulate FPU such as discussed with reference to FIG. 3A to execute an instruction which evaluates the expression A−(B*C), and hence rounding is only performed on the final product. As mentioned earlier, this technique is not compliant with the IEEE 754-1985 standard since that standard defines that a rounding operation should be performed on the result of the multiplication.

In preferred embodiments of the present invention, this problem is solved as follows. The data path elements 60 of the FPU 26 illustrated in FIG. 2 is arranged to perform a chained floating multiply-accumulate operation (A+(B*C)) in response to an FMAC instruction, or a chained floating-point multiply-subtract operation (−A+(B*C)) in response to an FMSC instruction. In accordance with preferred embodiments of the present invention, two further instructions are defined as follows:

FNMAC: A–(B*C)
FNMSC: –A–(B*C)

The FNMAC instruction can be considered as a negate-multiply accumulate instruction, whilst the FNMSC instruction can be considered as a negate-multiply subtract instruction. It has been found that these instructions enable correct algebraic results to be obtained for negated versions of the multiply-accumulate and multiply-subtract operations, whilst also producing correctly signed zero values as required by the IEEE 754-1985 standard.

Figure 4:
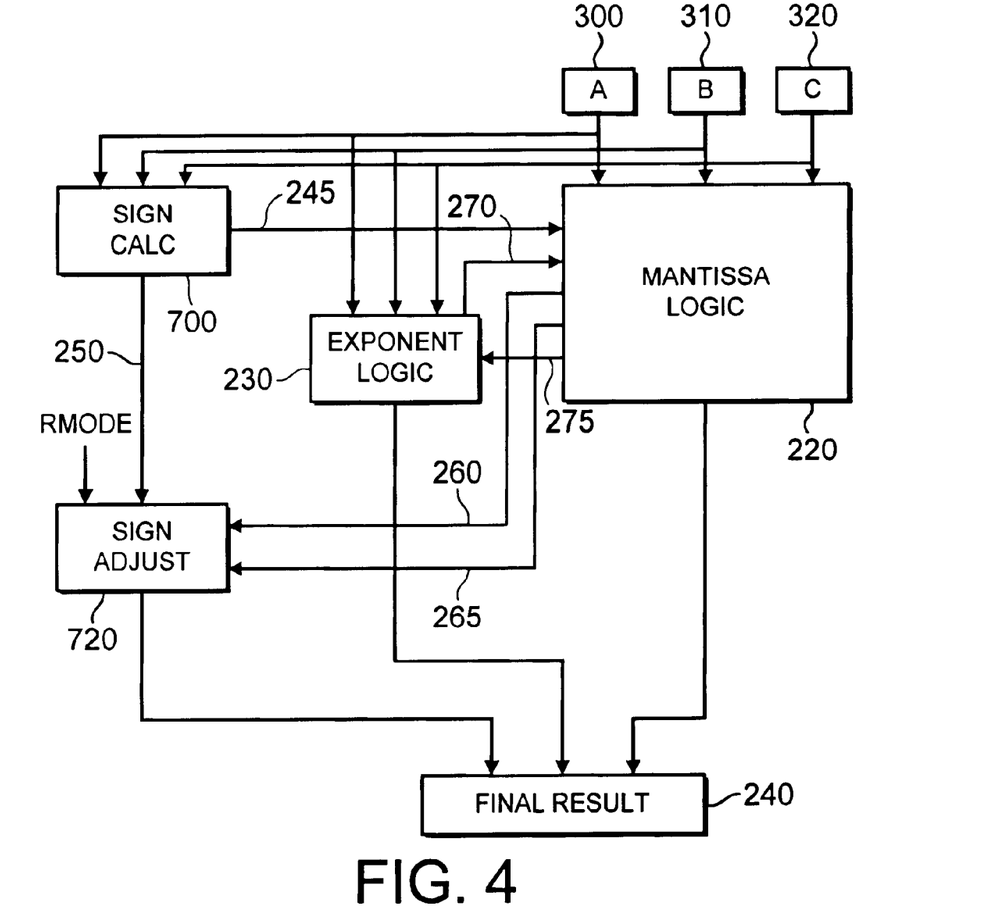
FIG. 4 is a block diagram illustrating elements used in a preferred embodiment of the present invention to produce negated versions of the multiply-accumulate and multiply-subtract operations.

FIG. 4 is a block diagram illustrating elements used in a preferred embodiment of the present invention to produce negated versions of the multiply-accumulate and multiply-subtract operations based on the FNMAC and FNMSC instructions. Input registers 300, 310, and 320 supply the A, B, and C input operands used in the floating-point operation. The sign values of the operands are passed to SignCalc logic 700, the exponent values to Exponent Logic 230 and the mantissa values to Mantissa Logic 220. As will be discussed later with reference to FIGS. 5A and 5B, the SignCalc block 700 outputs over path 250 an initial determination of the result sign, and generates a signal over path 245 used to control the addition performed within the mantissa logic 220.

The multiplication and addition stages within the mantissa logic cause certain signals to be output over paths 260 and 265 to the sign adjust logic 720, which also receives an indication of the rounding mode being used. As will be discussed in more detail with reference to FIGS. 5A and 5B, the sign adjust logic 720 then determines whether any adjustment is required to the sign.

The exponent logic 230 determines the exponent value of the final result based on the exponents of the input operands and generates an alignment value passed over path 270 to the mantissa logic for use in the operations applied to the mantissas. Further, the mantissa logic 220 may produce one or more signals over path 275 used by the exponent logic to adjust the exponent value of the final result. Again, this will be discussed in more detail with reference to FIGS. 5A and 5B.

Figure 5A:
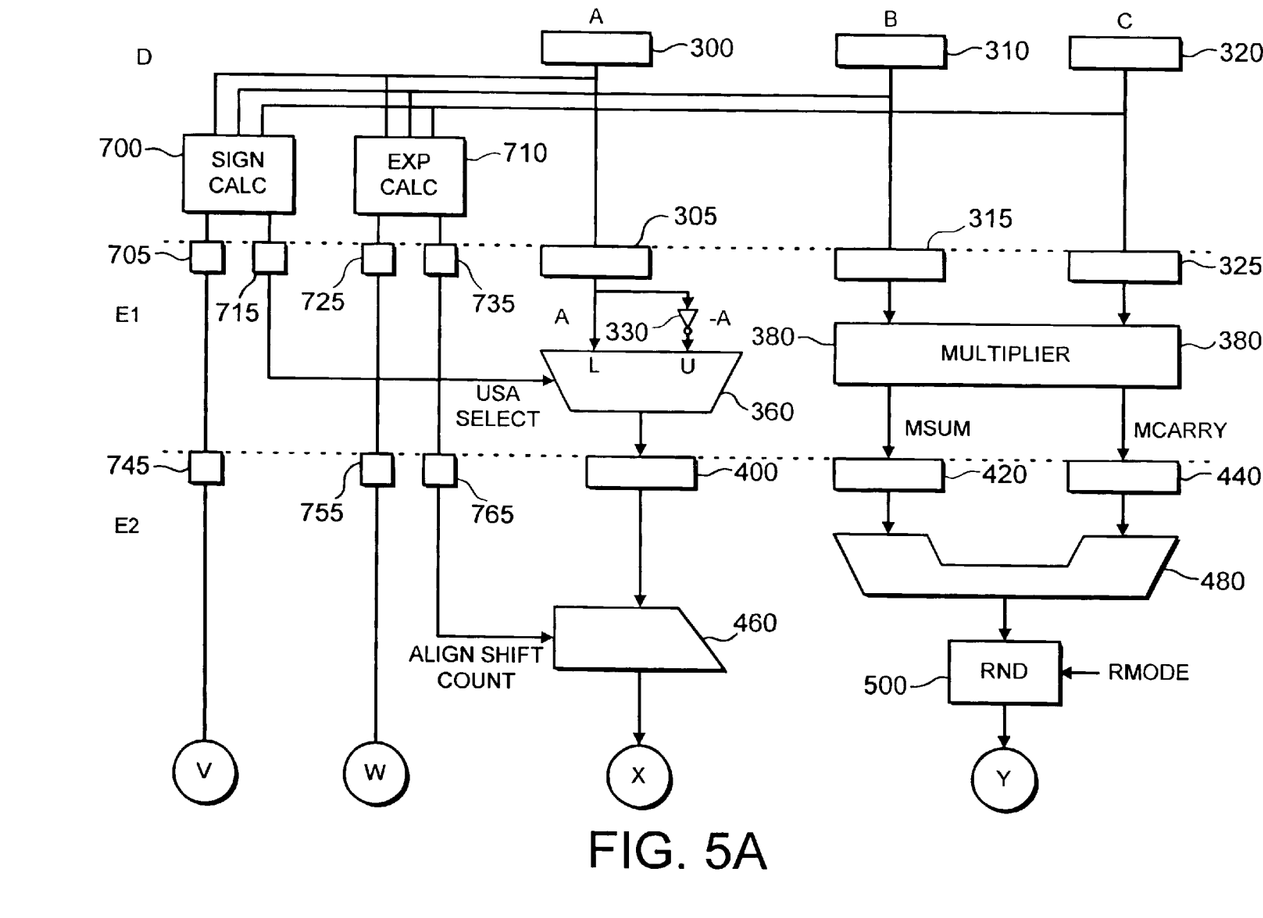
FIGS. 5A and 5B are block diagrams illustrating in more detail the logic of FIG. 4.
Figure 5B:
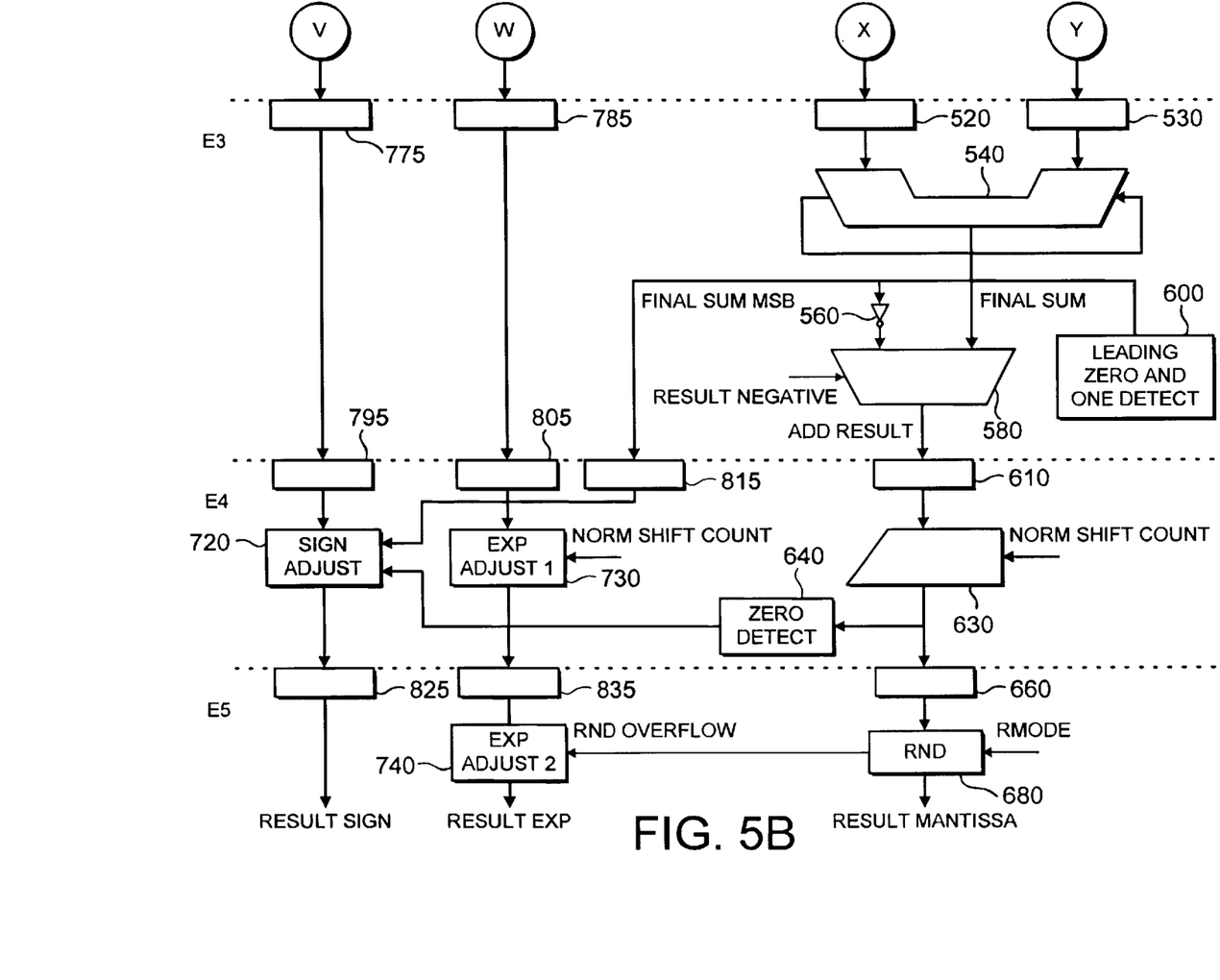

FIGS. 5A and 5B are block diagrams illustrating in more detail the logic of FIG. 4. Input registers 300, 310, and 320 supply the A, B, and C input operands, respectively, in Stage D (decode stage). The mantissas of A, B and C are passed to registers 305, 315 and 325. The sign bit of each operand is input to the SignCalc block 700 for an initial determination of the result sign. This determination is based on the arbitrary assumption that the A input operand is larger than the product of the B operand and the C operand. It is possible that this assumption may prove wrong, but as will be apparent from the remaining discussion of FIGS. 5A and 5B, the logic of FIGS. 5A and 5B will automatically compensate for such situations.

Further, as will be appreciated by those skilled in the art, two distinct cases exist in floating-point addition, the like-signed addition and the unlike-signed addition. In a like-signed addition (LSA) the signs of the input operands are equal for an add operation and opposite for a subtraction. In an unlike-signed addition (USA) the signs are opposite for an addition and equal for a subtraction. The determination as to which type of addition to use is also made by the SignCalc block 700 as will be discussed below.

The initial sign computation performed by SignCalc block 700 considers the input sign bits A-sign, B-sign and C-sign (0 indicates a positive sign, 1 a negative sign), the instruction (whether an addition or subtraction is selected), and whether the product is to be negated (for FNMAC and FNMSC instructions). The product sign (P-Sign) is the exclusive-or of B-sign and C-sign. A NegateProduct signal is true (i.e. 1) if the operation is one of FNMAC or FNMSC. It functions to invert the value of P-Sign.

Table 1 shows the values of the InitialSign signal and the USASelect signal output from SignCalc block 700, dependent on the values of the various input signals:

TABLE 1

| A-Sign | P-Sign | FMAC OR FNMAC | FMSC OR FNMSC | Negate-Product | Initial Sign | USA-Select | Operation |
|---|---|---|---|---|---|---|---|
| 0 | 0 | 1 | 0 | 0 | 0 | 0 | LSA |
| 0 | 1 | 1 | 0 | 0 | 0 | 1 | USA |
| 1 | 0 | 1 | 0 | 0 | 1 | 1 | USA |
| 1 | 1 | 1 | 0 | 0 | 1 | 0 | LSA |
| 0 | 0 | 1 | 0 | 1 | 0 | 1 | USA |
| 0 | 1 | 1 | 0 | 1 | 0 | 0 | LSA |
| 1 | 0 | 1 | 0 | 1 | 1 | 0 | LSA |
| 1 | 1 | 1 | 0 | 1 | 1 | 1 | USA |
| 0 | 0 | 0 | 1 | 0 | 1 | 1 | USA |
| 0 | 1 | 0 | 1 | 0 | 1 | 0 | LSA |
| 1 | 0 | 0 | 1 | 0 | 0 | 0 | LSA |
| 1 | 1 | 0 | 1 | 0 | 0 | 1 | USA |
| 0 | 0 | 0 | 1 | 1 | 1 | 0 | LSA |
| 0 | 1 | 0 | 1 | 1 | 1 | 1 | USA |
| 1 | 0 | 0 | 1 | 1 | 0 | 1 | USA |
| 1 | 1 | 0 | 1 | 1 | 0 | 0 | LSA |

In Table 1, the first four entries are for an FMAC instruction, the second four entries are for an FNMAC instruction, the third four entries are for an FMSC instruction and the final four entries are for a FNMSC instruction. The InitialSign value is stored in register 705 and the USA-Select signal is stored in the register 715.

Also at stage D, the ExpCalc block 710 generates the initial exponent value for the result and the AlignShiftCount signal to drive the Aligner 460. The initial exponent value is the larger of the A input operand exponent and the calculated product exponent (B input operand exponent added to C input operand exponent). The AlignShiftCount is based on the difference between the A input operand exponent value and the calculated product exponent. The initial exponent is stored in register 725 and the AlignShiftCount value is stored in register 735.

In stage E1, inverter 330 generates a complemented A input operand. The complemented A input is left in the 1's complement form for the end-around-carry adder 540 in stage E3. The Augend is generated by mux 360 which selects between the A input operand or the complemented A input operand based on the input signal USASelect. The complemented A input operand is selected in all USA cases, while the A input operand is selected in all LSA cases. The output of mux 360 is registered in register 400. The augend is then shifted by the Aligner 460 in stage E2 based on the AlignShiftCount value to align the mantissa with the product before the summation in the third stage E3, the output from the Aligner 460 being registered in register 520. This results in a larger design but eliminates several paths which would compromise the speed of the hardware.

In other implementations, the exponents of the A input and the product of the B input and the C input may be used to determine the smaller of the A input and the product of B and C and select that smaller data to be inverted and shifted.

The B input operand mantissa and the C input operand mantissa are multiplied in Stage E1 by the multiplier 380 to produce an MSum and an MCarry output. These are registered in registers 420 and 440, respectively. The registered MSum and MCarry data are added in Stage E2 in the adder 480 and rounded in rounder 500 according to the current rounding mode specified by an Rmode signal and to the desired result precision. The rounded Product value is registered in register 530.

In Stage E3, the final addition of the Augend and the Product is performed by end-around-carry adder 540. The FinalSum result output by the adder requires no modification for a positive result (FinalSum MSB of adder 540 is 0) or a simple inversion of the output if the result is negative (FinalSum MSB of adder 540 is 1). This inversion operation is performed by inverter 560, and mux 580 is then used to select either the inverted or non-inverted value as the AddResult value, dependent on the ResultNegative signal, which is derived from the FinalSum MSB signal issued by the end-around-carry adder 540. The AddResult value is registered in register 610.

A Leading 0 and 1 detector 600 computes the location of the most significant '1' and most significant '0' in the FinalSum result. If the FinalSum result is positive, the location of the most significant 1 is used in the generation of the NormShiftCount value used in Stage E4 to normalize the result and adjust the InitialExponent; if the result is negative, the location of the most significant zero, detected in the FinalSum value before inversion, is used in the generation of the NormShiftCount value.

In stage E4, the output of register 610 is input to Normalizer 630 with the NormShiftCount value calculated at stage E3. The Normalizer 630 has the ability to shift the AddResult two places to the right or many places to the left. For LSA operations, the NormShiftCount value can be +2, +1 or 0. For USA operations, the NormShiftCount value can be +1, 0, or −1 to n, where n is the size of the mantissa. The AddResult value is normalized by shifting it to the right for a positive NormShiftCount value or to the left for a negative NormShiftCount value. The exponent is adjusted in stage E4 by adding the NormShiftCount value in the exponent adjust (ExpAdjust 1) block 730.

The ZeroDetect block 640 outputs the ZeroResult signal at stage E4 when the result of the normalization operation is a zero result.

Further, in Stage E4, the InitialSign value from Stage D is adjusted by Sign Adjust logic 720 based on the FinalSum MSB output by adder 540 (this MSB having been stored in register 815) and the result of the ZeroDetect block 640. If the MSB is zero (i.e. FinalSum is positive) and the operation was an USA, the arbitrary decision to invert the Augend rather than the product at stage E1 was incorrect, and the InitialSign must be inverted in order to generate the ResultSign. If the MSB is one (i.e. FinalSum is negative, only possible for USA operations), the arbitrary decision to invert the Augend rather than the product was correct, and the InitialSign becomes the ResultSign. If the operation was a LSA, the Augend will not have been inverted, and accordingly the Sign Adjust logic 720 will make no adjustment to the InitialSign value.

If the FinalSum value is zero, the InitialSign is overridden by the Sign Adjust logic 720 with the zero result sign value specified by the IEEE 754-1985 standard. Specifically, if the rounding mode is RP, RN or RZ, the Result Sign is set to 0 (i.e. positive), whilst if the rounding mode is RM, the ResultSign is set to 1 (i.e. negative). The Result Sign is stored in register 825.

If the result is not zero, the Rounder 680 in Stage E5 rounds the result to the current rounding mode specified by an RMode signal and to the desired result precision, and then the result, with the exponent and sign bits, is written back to the register file. If the rounding operation causes an overflow of the mantissa, the exponent is incremented in the exponent adjust (ExpAdjust2) block 740 to form the ResultExponent (ResultExp) value and the ResultMantissa is shifted a single place to the right.

The final result of the operation is made up of the ResultSign bit, the ResultExp value, and the ResultMantissa value.

Given the above description, it will be appreciated that in accordance with preferred embodiments of the present invention, two new instructions are provided, namely FNMAC which causes a result to be generated equivalent to multiplying B and C, negating the product, and then adding the negated product to A, and FNMSC which causes a result to be generated equivalent to multiplying B and C, negating the product, negating A, and then adding the negated product to the negated A.

The use of these instructions provides IEEE 754-1985 standard compliant negated versions of the multiply-accumulate and multiply-subtract operations. These are useful in complex multiply routines, FFT and filter routines, and general computational use by a compiler. It is important for the IEEE 754-1985 standard compliant results to be produced as, for example, the Java platform requires the handling of zeros to conform to that standard.

For completeness, to illustrate that the prior art approach employing a fused FPU to evaluate A−(B*C) would not produce an IEEE 754-1985 compliant result, there follows a description of the possible differences between a fused operation for evaluating A−(B*C), a chained operation for evaluating A−(B*C), and separate IEEE 754 multiply/negate/add operations.

A negate multiply-add operation can be defined as a function of the form F=A−(B*C) where F, A, B, and C are floating-point values comprising a sign bit (s), exponent (in biased or unbiased form), an implied integer bit, and an n-bit significand. A floating-point value is defined as:

$$X = -1^s * (1 + f * 2^{-n}) * 2^E$$

where X is a floating-point value, s is the sign bit (0 for positive, 1 for negative), f is an n-bit significand, and E is the exponent (here considered unbiased).

For the present discussions, a positive X will be defined as a $*2^{-n}*2^E$, with a $=2^n+f$. We can specify the value of a positive A to be:

$$A = a * 2^{-n} * 2^E$$

The product of 2 n+1-bit binary values, with a 1 in the most significant bit of each binary value, is a third binary value with 2n+1 or 2n+2 bits. In a floating-point system with an n-bit significand only the upper n+1 bits are considered significant, while the lower n or n+1 bits are used to determine the rounding value to be applied to the result.

In this example, the product is chosen to be congruent to the A operand when the product is rounded, and slightly smaller before rounding. If the case of a product which has 2n+1 bits is considered, we can specify the unrounded product of B and C to be:

$$(B*C)_{UR} = ((a-1)*2^{-n} + d*2^{-2n}) * 2^E$$

where a−1 is the value of the upper n+1 bits and d is the value of the lower n bits.

We also specify that d is such that the value of d will cause a rounding to be performed on the product, resulting in a rounded product of:

$$(B*C)_R = (a*2^{-n})*2^E$$

In the fused negate multiply-add operation the product of B and C, is added to the A operand before rounding, resulting in a sum of:

$$\text{Sum} = A - (B*C) = (a*2^{-n})*2^E - ((a-1)*2^{-n} + d*2^{-2n})*2^E$$

$$\text{Sum} = 2^E * (2^{-n} * (a - a + 1) - d*2^{-2n})$$

$$\text{Sum} = 2^E * (2^{-n} - d*2^{-2n})$$

In the chained negate multiply-add operation the product is first rounded to n bits before added to the A operand. The result is:

$$\text{Sum} = A - (B*C) = (a*2^{-n})*2^E - (a*2^{-n})*2^E$$

$$\text{Sum} = +0$$

If the A operand is negative and the product (B*C) is also negative, the result of a fused negate multiply-add operation is:

$$-(2^E * (2^{-n} - d*2^{-2n}))$$

while the chained negate multiply-add returns +0.

Note that the 2 results are not only different but have opposite signs.

In a processor without the family of multiply-add operations, a negate multiply-add function would be performed by first multiplying B and C and rounding the resulting product. This would be followed by a negate of the product, and finally a sum of the A operand and the negated product, or a subtraction of the product from A. A processor performing this series of operations will produce the same +0 as the chained negate multiply-add. This is significant in that code which followed this function and depended on the sign of the operation or the magnitude result will behave differently on a processor implementing a fused negate multiply-add than on a processor adhering to the IEEE 754 standard, whether implementing this function with separate multiply, negate, and add, or with a chained negate multiply-add operation.

Although a particular embodiment of the invention has been described herewith, it will be apparent that the invention is not limited thereto, and that many modifications and additions may be made within the scope of the invention. For example, although the preferred embodiment has been described in relation to a CPU with a physically separate coprocessor, this need not be the case. For example, the floating-point unit may be provided within the main processor. In addition, various combinations of the features of the following dependent claims could be made with the features of the independent claims without departing from the scope of the present invention.

We claim:

1. A data processing apparatus for applying a floating-point multiply-accumulate operation to first, second and third operands, comprising:
   a multiplier for multiplying the second and third operands and applying rounding to produce a rounded multiplication result;
   an adder for adding the rounded multiplication result to the first operand to generate a final result, and for applying rounding to generate a rounded final result; and
   control logic, responsive to a first single instruction, to control the multiplier and adder to cause the rounded final result generated by the adder to be equivalent to the subtraction of the rounded multiplication result from the first operand, wherein the control logic includes primitive determination logic responsive to the first single instruction and the sign values of the first, second and third operands to determine whether to cause the adder to perform a like-signed addition (LSA) operation or an unlike-signed addition (USA) operation, and to generate a control signal dependent on the determination.

2. A data processing apparatus as claimed in claim 1, wherein, responsive to the first single instruction, the primitive determination logic is arranged to determine from the sign values of the second and third operands the sign value of the rounded multiplication result and to determine that a USA operation should be performed by the adder if the sign of the first operand and the sign of the rounded multiplication result are the same, and that an LSA operation should be performed by the adder if the sign of the first operand and the sign of the rounded multiplication result are not the same.

3. A data processing apparatus as claimed in claim 1, wherein the adder includes a multiplexer for selecting either the first operand or the negated first operand to be added to the rounded multiplication result, and the control signal is supplied to the multiplexer to cause the negated first operand to be selected for USA operations, and the first operand to be selected for LSA operations.

4. A data processing apparatus as claimed in claim 1, further comprising sign calculation logic incorporating the primitive determination logic and further arranged to generate an initial sign value for the final result.

5. A data processing apparatus as claimed in claim 4, wherein the sign calculation logic is arranged to be responsive to the first single instruction to select the sign of the first operand as the initial sign value.

6. A data processing apparatus as claimed in claim 5, wherein if a sum value generated by the adder is negative, it is inverted prior to generation of the final result, the apparatus further comprising sign adjust logic arranged to invert the initial sign value if a USA operation was performed and the sum value is positive, but to leave the initial sign unadjusted if the sum value is negative.

7. A data processing apparatus as claimed in claim 6, wherein if the final result is zero, the sign adjust logic is arranged to override the initial sign value with a sign value indicated by a predetermined rounding mode.

8. A data processing apparatus as claimed in claim 1, wherein said adder further comprises rounding logic for performing a rounding operation on the final result as specified by a predetermined rounding mode in order to generate the rounded final result.

9. A data processing apparatus as claimed in claim 1, wherein the control logic is responsive to a second single instruction to control the multiplier and adder to cause the rounded final result generated by the adder to be equivalent to the subtraction of the rounded multiplication result from the negated first operand.

10. A data processing apparatus for applying a floating-point multiply-subtract operation to first, second and third operands, comprising:
   a multiplier for multiplying the second and third operands and applying rounding to produce a rounded multiplication result;
   an adder for adding the rounded multiplication result to the negated first operand to generate a final result and for applying rounding to generate a rounded final result; and control logic, responsive to a first single instruction, to control the multiplier and adder to cause the rounded final result generated by the adder to be equivalent to the subtraction of the rounded multiplication result from the negated first operand, wherein the control logic includes primitive determination logic responsive to the first single instruction and the sign values of the first, second and third operands to determine whether to cause the adder to perform a like-signed addition (LSA) operation or an unlike-signed addition (USA) operation, and to generate a control signal dependent on the determination.

11. A data processing apparatus as claimed in claim 10, wherein, responsive to the first single instruction, the primitive determination logic is arranged to determine from the sign values of the second and third operands the sign value of the rounded multiplication result and to determine that an LSA operation should be performed by the adder if the sign of the first operand and the sign of the rounded multiplication result are the same, and that a USA operation should be performed by the adder if the sign of the first operand and the sign of the rounded multiplication result are not the same.

12. A data processing apparatus as claimed in claim 10, wherein the adder includes a multiplexer for selecting either the first operand or the negated first operand to be added to the rounded multiplication result, and the control signal is supplied to the multiplexer to cause the negated first operand to be selected for USA operations, and the first operand to be selected from LSA operations.

13. A data processing apparatus as claimed in claim 10, further comprising sign calculation logic incorporating the primitive determination logic and further arranged to generate an initial sign value for the final result.

14. A data processing apparatus as claimed in claim 13, wherein the sign calculation logic is arranged to be responsive to the first single instruction to select the initial sign value to be equal to the negated sign of the first operand.

15. A data processing apparatus as claimed in claim 14, wherein if a sum value generated by the adder is negative, it is inverted prior to generation of the final result, the apparatus further comprising sign adjust logic arranged to invert the initial sign value if a USA operation was performed and the sum value is positive, but to leave the initial sign unadjusted if the sum value is negative.

16. A data processing apparatus as claimed in claim 15, wherein if the final result is zero, the sign adjust logic is arranged to override the initial sign value with a sign value indicated by a predetermined rounding mode.

17. A method of applying within a data processing apparatus a floating-point multiply-accumulate operation to first, second and third operands, comprising the steps of:

multiplying the second and third operands and rounding to produce a rounded multiplication result;

adding the rounded multiplication result to the first operand to generate a final result and rounding to generate a rounded final result; and responsive to a first single instruction, controlling the multiplier and adder to cause the rounded final result generated by the adder to be equivalent to the subtraction of the rounded multiplication result from the first operand, said controlling step including the step, in response to the sign values of the first, second and third operands, determining whether to cause the adder to perform a like-signed addition (LSA) operation or an unlike-signed addition (USA) operation, and generating a control signal dependent on said determination.

18. A method of applying within a data processing apparatus a floating-point multiply-subtract operation to first, second and third operands, comprising the steps of:

arranging a multiplier to multiply the second and third operands and apply rounding to produce a rounded multiplication result;

arranging an adder to add the rounded multiplication result to the negated first operand to generate a final result and to apply rounding to generate a rounded final result; and responsive to a first single instruction, controlling the multiplier and adder to cause the rounded final result generated by the adder to be equivalent to the subtraction of the rounded multiplication result from the negated first operand, said controlling step including the step, in response to the sign values of the first, second and third operands, determining whether to cause the adder to perform a like-signed addition (LSA) operation or an unlike-signed addition (USA) operation, and to generating a control signal dependent on said determination.

* * * * *